Patented Apr. 12, 1932

1,853,807

UNITED STATES PATENT OFFICE

CYPRIEN GILLET, OF BORDEAUX, FRANCE

PROCESS FOR THE MANUFACTURE OF RESINOUS SOAPS

No Drawing. Application filed August 25, 1930, Serial No. 477,799, and in France May 22, 1930.

This invention relates to improved process for the manufacture of resinous soaps.

It is known that the alkalis generally employed for the manufacture of soap are either caustic soda, or carbonate of soda.

Potash salts are only employed in certain well defined cases, notably in the manufacture of the soft soaps.

In the manufacture of the resinous soaps suitable for sizing paper or for other uses either hydrate of soda or carbonate of soda can be used according to economic conditions or the rapidity which it is desired to accomplish the operation.

It is known that differences in the production of resins, the way in which they have been treated, the periods at which they have been distilled, are factors which will vary their physical and chemical properties and consequently will render difficult the final obtention of a regular soap completely resistant to variations of temperature. It is however indispensable to have a soap the composition of which will be always the same if it is desired to be sure of always obtaining the same results in the use thereof.

In this connection I have ascertained that according to the form in which the soda or its compounds is used, the molecular division becomes greater or less.

The present invention relates to a process for effecting in a rapid and mathematical manner the obtention of resinous soaps having very great molecular division and consequently very great covering power. The soaps obtained by my process have moreover a fine appearance and are highly resistant to cold.

The said process consists in the particular combination of the following characteristics.

A.—The employment as saponifiers of the resin of a mixture of carbonated alkali and bicarbonated alkali, and of a volatile alkali (ammonia).

B.—The saponification of the resin is effected in two distinct and successive stages: The 1st stage is performed with the above mentioned mixture of carbonated and bicarbonated alkali in the proportion of 40 to 60 per cent for instance of bicarbonate according to the carbonate chosen. The quantity of this saponifying mixture is determined for saponifying only a portion of the mass of resin to be treated and leaving the remaining portion untouched. The second stage of saponification is performed with volatile alkali (ammonia) the amount of which is limited to that necessary for only acting on that part of the mass of resin which has not been saponified in the first stage by the carbonated and bicarbonated mixture.

The employment of bicarbonate of soda mixed with carbonate in the first stage of saponification and of ammonia in the second stage, give the following advantages in the manufacture of a resinous soap:—

Bicarbonate of soda being a much weaker alkali than carbonate or hydrate of soda, it will react more slowly whilst discharging a large amount of carbonic acid. This amount of carbonic acid makes the soapy mass lighter and, by its passage through the said mass, accentuates the molecular division of the preparation. Agglomeration of the molecules of resinate formed is thus avoided and the resinous soap obtained is of a much finer grain than that of soaps obtained by the use of a hydrate or of the carbonate as saponifier.

The ammonia possesses, beside its saponifying power, a great solubilizing power and easily evaporates, the two latter properties assist in effecting a complete, instantaneous and mathematical perfection of the soap.

Into a suitable boiler or heater an amount for instance 100 kilogrs. of resin is placed and as much water, then a mixture of carbonated and bicarbonated alkalis is added in a quantity necessary for saturating say 88% of the resin put in operation. If the bicarbonate is employed in about the proportion of half the carbonate, then approximately 11 kilogrs. of carbonate of soda and 5 kilogrs. of bicarbonate of soda will be required.

The boiler is heated by steam for example and when cooking is considered sufficient, water and a volatile alkali (ammonia) are added, the amount of alkali being sufficient to saturate the 12 kilogrs. of resin which have not been affected by the carbonated alkali. For this second phase of saponification by means of ammonia liquid it is necessary to employ about 4 kilograms of aqueous ammonia solution having a density of 0.930 (which would contain about 18% of pure ammonia) when the quantity of hydrated resin to saponify is 12 kilogr. that is to say the proportion of ammonia liquid is 1/3 to 2/3 hydrated resin. The heating by steam is continued so as to bring the mixture up to boiling point for some minutes, at the end of which time the product is finished.

It can be understood that, during the second stage of saponification, the ammonia, which is a volatile alkali of great solubilizing power will instantly react on the resin which has not been saponified in the first stage and which exists in suspension in hydrated form, in the resinate formed during the first stage since after sufficient heating the whole contained in the boiler is constituted by the resinate formed by the saponification of 88% of the resin acted on by the definite quantity of the mixture of carbonated and bicarbonated alkalis and by the 12% of resin not acted on which is in the hydrated state that is to say is in suspension in the water and not saponified. The volatile qualities of the ammonia allow of easy and rapid elimination thereof during the boiling of the resinous mass.

What I claim as my invention and desire to secure by Letters Patent of the United States is:—

1. Process for the manufacture of resinous soap in which the materials for saponifying the resin consist of a mixture of a carbonated alkali and a bicarbonated alkali and in addition a volatile alkali, the saponification of the resin being effected in two distinct and successive stages, the first stage being performed with the mixture of carbonated alkali and bicarbonated alkali used in a determined amount for saponifying only a portion of the mass of resin to be treated and the second stage of saponification being performed with the volatile alkali employed in an amount limited to that necessary for acting on the portion of the mass of resin not saponified in the first stage.

2. Process as in claim 1 wherein the alkalis used in the first stage are bicarbonate of soda and carbonate of soda in the proportions of 40 to 60% the volatile alkali being ammonia.

CYPRIEN GILLET.